United States Patent [19]

Weatherby

[11] 4,250,762
[45] Feb. 17, 1981

[54] ACTUATOR HAVING A DRIVE SCREW AND A SELECTIVELY ROTATABLE NUT

[75] Inventor: John H. Weatherby, Pitman, N.J.

[73] Assignee: Warner Electric Brake & Clutch Company, South Beloit, Ill.

[21] Appl. No.: 25,742

[22] Filed: Mar. 30, 1979

[51] Int. Cl.³ .............................................. F16H 1/18
[52] U.S. Cl. .............................. 74/89.15; 74/424.8 R
[58] Field of Search ........................... 74/89.15, 424.8; 192/26; 188/82.6, 77 W

[56] References Cited

U.S. PATENT DOCUMENTS

| | | | |
|---|---|---|---|
| 2,649,300 | 8/1953 | Launder | 74/424.8 R |
| 2,860,521 | 11/1958 | Sierant | 74/424.8 R |
| 2,893,258 | 7/1959 | Meyer | 74/424.8 R |
| 3,087,587 | 4/1963 | Flieg | 192/26 |
| 3,157,058 | 11/1964 | Haller | 74/424.8 R |
| 3,393,779 | 7/1968 | Sacchini | 192/26 |
| 3,648,810 | 3/1972 | Weatherby | 192/26 |

Primary Examiner—Lawrence J. Staab
Attorney, Agent, or Firm—Leydig, Voit, Osann, Mayer & Holt, Ltd.

[57] ABSTRACT

A linear actuator includes a nut threaded onto a rotatable drive screw and adapted to be coupled to and uncoupled from an axially movable driven member by a selectively engageable and disengageable helical spring clutch and a friction clutch connected in series with the spring clutch. When the spring clutch is disengaged, the nut is permitted to rotate with the screw and thus the driven member remains stationary. When the spring clutch is engaged, it acts through the friction clutch to couple the nut to the driven member and prevent rotation of the nut so that the driven member advances along the screw. When the driven member reaches a limit position, a positive stop automatically releases the friction clutch to interrupt the drive to the driven member even though the spring clutch remains engaged.

9 Claims, 4 Drawing Figures

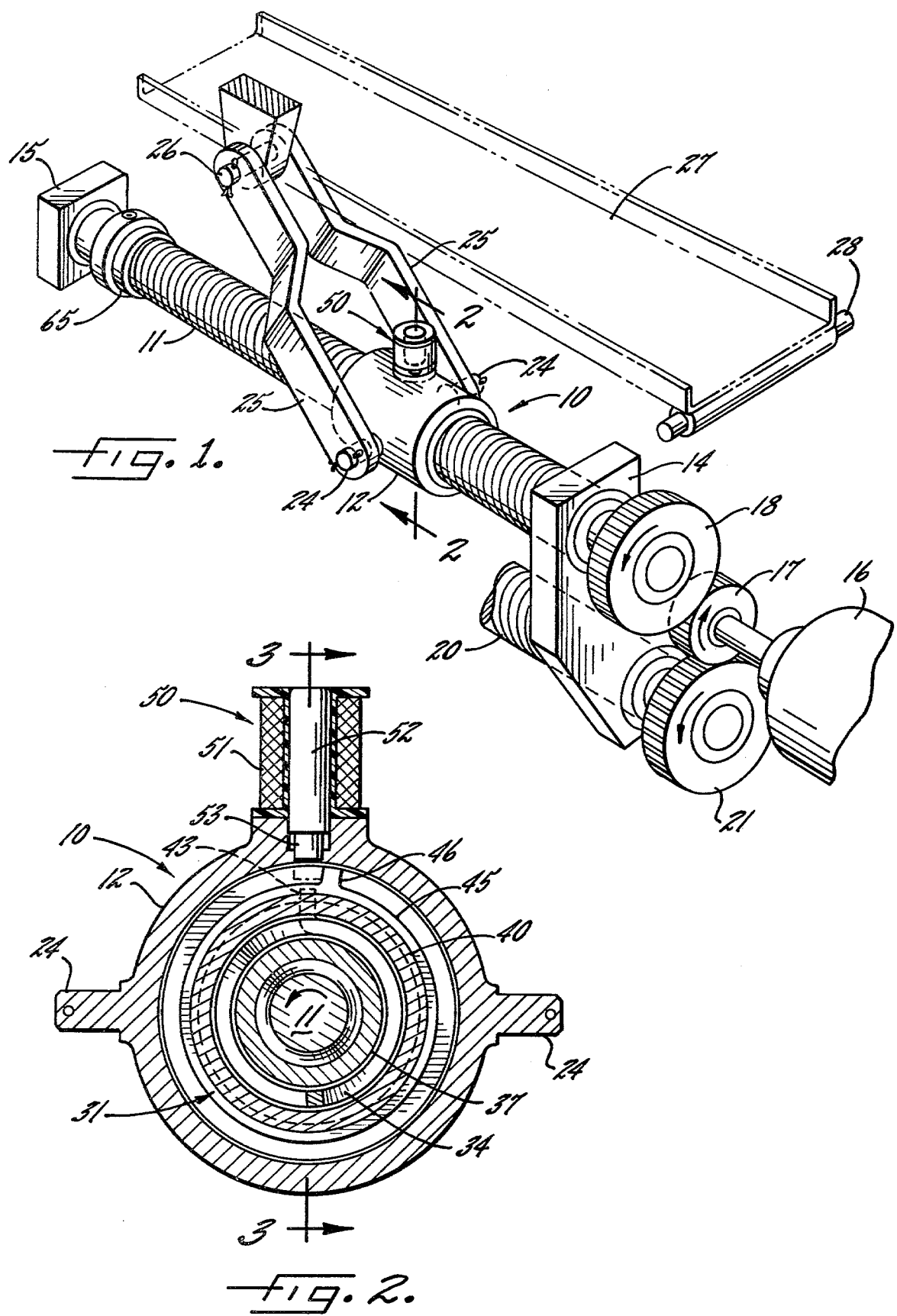

ACTUATOR HAVING A DRIVE SCREW AND A SELECTIVELY ROTATABLE NUT

BACKGROUND OF THE INVENTION

This invention relates generally to a linear actuator and more particularly to a linear actuator of the type in which the linear motion is produced by rotating a drive screw to advance a nut axially along the screw. A driven member which is fixed against rotation is associated with the nut and will be advanced as long as the nut also is held against rotation.

SUMMARY OF THE INVENTION

The general aim of the present invention is to provide a new and improved linear actuator in which the nut can be selectively clutched against and released for rotation so as to selectively establish or interrupt movement of the driven member, the nut preferably being capable of being automatically released for rotation and interrupting the drive when a limit position is reached.

A more detailed object is to achieve the foregoing by providing a linear actuator in which a helical spring clutch is used to selectively hold or release the nut when the clutch is engaged or disengaged, respectively, and in which a friction clutch is uniquely combined with the spring clutch to allow rotation of the nut when a limit position is reached even if the spring clutch is engaged.

Still another object is to provide a linear actuator in which a pilot friction clutch is associated with the main friction clutch to effect engagement of the latter under a low load condition.

The invention also resides in the incorporation of the nut and the clutches into a comparatively simple and compact package.

These and other objects and advantages of the invention will become more apparent from the following detailed description when taken in conjunction with the accompanying drawings.

BRIEF DESCRIPTION OF THE DRAWINGS

FIG. 1 is a perspective view of a new and improved linear actuator incorporating the unique features of the present invention.

FIG. 2 is an enlarged cross-section taken substantially along the line 2—2 of FIG. 1.

DETAILED DESCRIPTION OF THE PREFERRED EMBODIMENT

Figure 3:
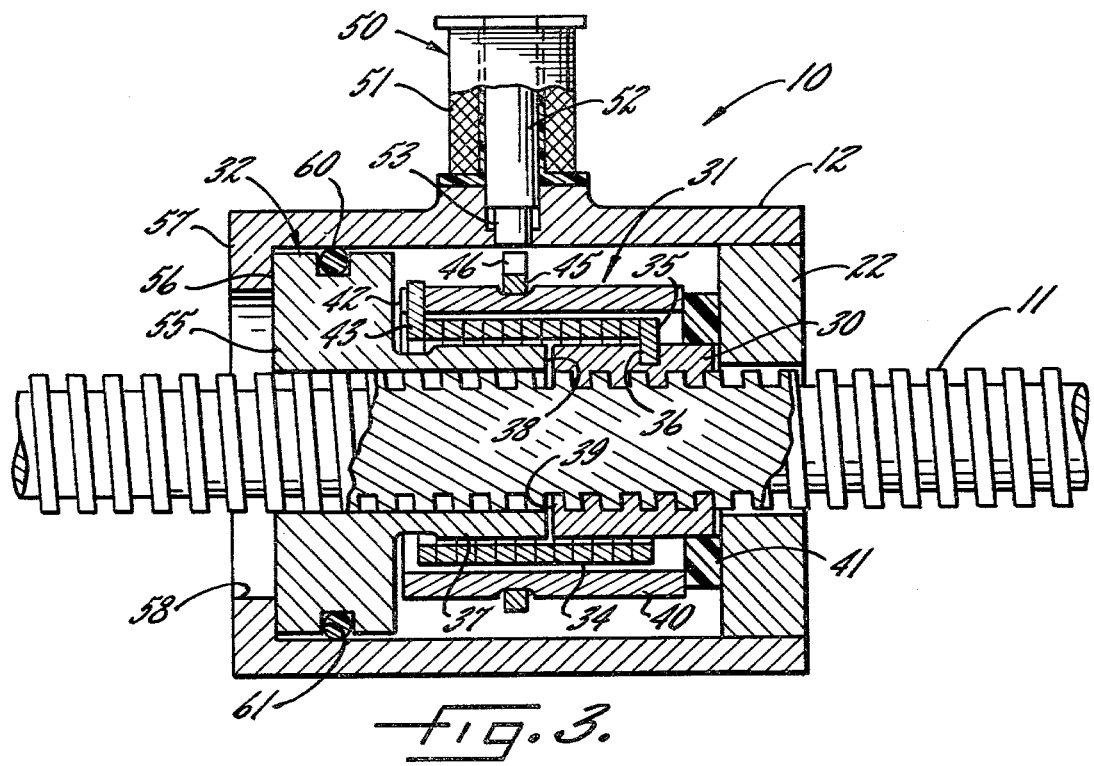
FIG. 3 is a fragmentary cross-section taken substantially along the line 3—3 of FIG. 2.

As shown in the drawings for purposes of illustration, the invention is embodied in a linear actuator 10 of the type in which a drive screw 11 is rotated to advance a driven member 12 axially along the screw. In this instance, the screw is journaled for rotation in a pair of bearing supports 14 and 15 and is adapted to be rotated by a reversible motor 16 which is connected to the screw by a pair of pinions 17 and 18. An additional screw 20 also may be rotated by the motor by means of a pinion 21 which meshes with the pinion 17.

The driven member 12 herein comprises a generally cylindrical housing having a fixed end wall 22 (FIG. 3) and having horizontally extending and diametrically spaced trunnions 23 (FIGS. 1 and 2). Pivotally connected to the trunnions are the lower ends of two links 25 whose upper ends are pivotally connected at 26 to an element 27 which is to be moved. While the element 27 can take various forms, it is shown here simply as being a tray which is adapted to be swung upwardly and downwardly about a horiztonal pivot 28 at one end of the tray. The tray 27 is swung upwardly about the pivot 28 when the driven member or housing 12 is advanced from right to left along the screw 11 and is lowered to the position shown in the drawings when the housing is moved in the opposite direction. More force is required, of course, to raise the tray than is the case when the tray is lowered. Indeed, the mass of the tray serves to lower the tray when the housing 12 is moved from left to right.

Disposed within the housing 12 is a nut 30 (FIG. 3) which is threaded onto the screw 11. As long as the nut is held against rotation, it will travel axially along the screw when the latter is rotated. No axial movement of the nut will occur, however, if the nut is permitted to rotate with the screw.

In accordance with the present invention, the nut 30 is connected to the housing 12 by a helical spring clutch 31 (FIG. 3) and also preferably by a friction clutch 32 which is in series with the spring clutch. The spring clutch may be selectively engaged or disengaged to couple or uncouple the nut and the housing so as to selectively (a) prevent rotation of the nut and permit axial movement of the housing or (b) permit rotation of the nut and interrupt axial movement of the housing. The friction clutch normally is engaged when the spring clutch is engaged and acts in conjunction with the spring clutch to couple the nut to the housing. The friction clutch, however, automatically disengages when the housing reaches a limit position and thus interrupts the drive even though the spring clutch might still be engaged.

More specifically, the spring clutch 31 includes a coiled helical spring 34 (FIGS. 2 and 3) which is telescoped over a portion of the nut 30. Formed on one end portion of the spring is an inwardly projecting tang 35 which is secured within a hole 36 in the nut. Thus, the spring rotates whenever the nut is rotated, the nut forming the input of the spring clutch.

The output of the spring clutch 31 is formed by a generally cylindrical hub 37 (FIG. 3) which is telescoped slidably and non-threadably over the screw 11 and which has one end 38 disposed in face-to-face relation with one end 39 of the nut. The helical spring 34 is also telescoped over the hub 37 and, when the spring clutch 31 is disengaged, the spring is relaxed and loosely surrounds the nut and the hub as shown in FIG. 3.

To control engagement and disengagement of the spring clutch 31, a collar 40 (FIG. 3) is telescoped loosely over the spring 34 and is spaced from the end wall 22 of the housing 12 by a bushing 41 which is telescoped over the nut 30. A slot 42 is formed in the opposite end of the collar 40 and receives an outwardly projecting tang 43 formed on the spring. Accordingly, the collar 40 rotates with the nut 30 and the spring 34.

Telescoped over and snugly engaging the collar 40 is a slip ring 45 (FIG. 2) formed with an outwardly projecting lug 46 (FIGS. 2 and 3). The ring 45 normally rotates with the collar 40 but, when the lug 46 is held, the ring slips on the collar while the latter continues to rotate. The drag which is created, however, by the ring slipping on the collar acts to retard rotation of the collar. As a result of the collar being retarded, the clutch spring 34 wraps down tightly on the nut 30 and the hub 37 to couple the two together for rotation in unison (see FIG. 4).

To hold the ring 45 and effect slippage thereof, a selectively operable actuator 50 is carried on the housing 12. While the actuator may take various forms, it herein is an electrically operated solenoid having a coil 51 mounted on the outside of the housing 12. The armature of the solenoid is defined by a plunger 52 disposed within the coil and having a lower end 53 extending into a hole formed through the housing 12. When the solenoid coil 51 is energized, the plunger 52 is held in an upwardly retracted position as shown in FIG. 3 and its lower end 53 is disposed out of the path of the lug 46 on the ring 45 so as to leave the latter free to rotate with the collar 40. Upon de-energization of the solenoid coil, the plunger drops downwardly and its lower end moves downwardly into the path of the lug 46 (see FIG. 4). Engagement of the lug with the plunger stops the ring and causes the ring to slip on the collar to retard rotation of the collar. When the collar is being rotated in a counterclockwise direction (FIG. 2), retardation of the collar by the ring results in the spring 34 being wrapped down on the hub 37 to couple the hub to the nut 30 (see FIG. 4).

In carrying out the invention, the friction clutch 32 is placed in series with the spring clutch 31 to couple the nut 30 to the housing 12. Herein, the input of the friction clutch 32 is formed by the hub 37 and by an enlarged hub or disc 55 (FIG. 3) formed integrally with the hub 37 and also received slidably and non-threadably on the screw 11. The outer diameter of the disc 55 is just slightly less than the inside diameter of the housing 12.

As shown in FIG. 3, the disc 55 is formed with an axially facing surface 56 which defines a friction face. The friction face is disposed in contact with the inboard side of an inwardly projecting annular flange 57 formed at the left end of the housing 12 and leaving an opening 58 at that end of the housing. When sufficient friction exists between the friction face 56 of the disc 55 and the flange 57 of the housing 12, the disc and the hub 37 are prevented from rotating. Thus, the housing 12 may be said to form a non-rotating output for the friction clutch 32. It should be noted that area of contact between the friction face 56 and the flange 57 is significantly greater than the area of contact between the end 39 of the nut 30 and the end 38 of the hub 37.

To explain the operation of the linear actuator 10, let it be assumed that the housing 12 is located about midway along the length of the screw 11 and that the latter is being rotated in a counterclockwise direction so as to tend to advance the housing from right to left to raise the tray 27. The mass of the tray acts through the trunnions 24 and biases the housing from left to right to force the flange 57 of the housing into engagement with the friction face 56 of the disc 55 and to force the end 38 of the hub 37 into engagement with the end 39 of the nut 30.

Now, if the plunger 52 is retracted and the spring clutch 31 is disengaged as shown in FIG. 3 while the screw is being rotated counterclockwise, the nut 30 will simply rotate with the screw and no axial movement of the housing 12 will be produced. As the nut rotates, the clutch spring 34, the control collar 40 and the slip ring 45 also rotate but the hub 37 and the disc 55 do not rotate since the spring clutch 31 is disengaged and the spring is loose on the hub. While there may be frictional engagement between the end 38 of the hub 37 and the adjacent end 39 of the nut 30, the frictional force resulting from such engagement is not sufficient to overcome the mass of the tray 27 and thus the nut simply slips relative to the hub without rotating the latter. Accordingly, the nut rotates with the screw and hence the housing does not advance from right to left.

Figure 4:
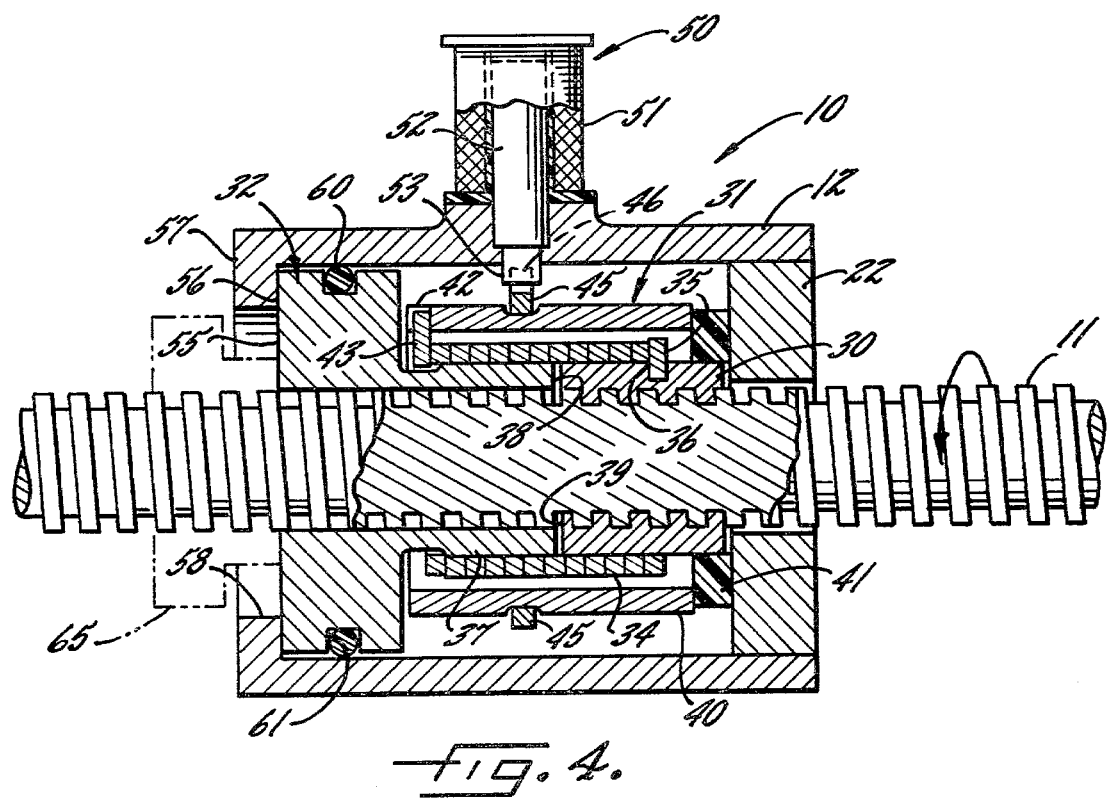
FIG. 4 is a view similar to FIG. 3 but shows certain parts in moved positions.

By de-energizing the solenoid coil 51, the plunger 52 is allowed to drop into the path of the lug 46 of the slip ring 45 (see FIG. 4). When the lug 46 is stopped by the plunger, the ring 45 slips on the collar 40 but imposes drag on the collar to retard the latter and to cause the helical clutch spring 34 to wrap down on and grip the nut 30 and the hub 37. Accordingly, the clutch spring 34 positively couples the nut 30 for rotation with the hub 37 and the disc 55. Rotation of the disc, however, is restricted by virtue of the frictional engagement of its friction face 56 with the flange 57 of the housing 12, the flange being forced against the friction face by the mass of the tray 12. Accordingly, the disc 55 is frictionally held against rotation and, by way of the clutch spring 34, prevents the nut 30 from rotating. Thus, counterclockwise rotation of the screw 11 produces right to left movement of the housing 12 to effect lifting of the tray 27.

In certain positions of the tray 27 or under low load conditions, the left to right force exerted by the tray on the trunnions 24 may be insufficient to place the flange 57 of the housing 12 in engagement with the friction face 56 of the disc 55. Under these circumstances, the disc simply would rotate freely with the nut 30 upon engagement of the spring clutch 31, would not be retarded by the flange 57 of the housing, and would not prevent rotation of the nut.

To insure against the foregoing, means are provided for creating radial pilot friction between the disc 55 and the housing 12. In the present instance, these means comprise an elastomeric O-ring 60 (FIG. 3) which is seated in a circumferentially extending groove 61 formed in the outer periphery of the disc 55. The outermost surface of the O-ring 60 is disposed in snug engagement with the inside surface of the housing 12.

When the spring clutch 31 is first engaged, the disc 55 tends to rotate with the nut 30. Such rotation is retarded, however, by virtue of the O-ring 60 frictionally engaging the inside surface of the housing 12. As a result, the disc is prevented from turning and, upon further rotation of the screw 11, the nut advances from right to left and pushes the friction face 56 of the disc into tight frictional engagement with the flange 57 of the housing. This creates a force to further retard rotation of the disc and the nut and thus the housing 12 is advanced from right to left along the screw. Accordingly, the radial pilot friction created by the O-ring 60 enables right to left movement of the nut 30 when the spring clutch 31 is first engaged and when the load conditions are such as to initially create only low axial friction between the housing 12 and the disc 55.

The significance of the friction clutch 32 may best be appreciated by assuming that the housing 12 has been advanced to a limit position at the far left end of the screw 11, that the screw is still being rotated in a counterclockwise direction by the motor 16 and that the spring clutch 31 is still engaged. Located at the limit position and pinned to the left end of the screw is a stop collar 65 (FIGS. 1 and 4) whose diameter is less than that of the opening 58 in the left end of the housing 12.

When the housing 12 has been advanced to the stop position, the disc 55 moves against and is engaged by the collar 65. This tends to push the friction face 56 of the disc away from the flange 57 of the housing and reduces the frictional force between the friction face and the flange. As a result, the friction face slips relative to the flange and allows the nut 30 to turn even though the spring clutch 31 is engaged. Turning of the nut prevents further leftward movement of the nut and thus neither the motor 16 nor the clutch spring 34 is overloaded even though the housing 12 has been advanced to the positive stop 65. Accordingly, the friction clutch 32 prevents the linear actuator 10 from being damaged when the limit position is reached.

When the screw 11 is driven in a clockwise direction, the housing 12 is advanced from left to right along the screw and lowers the tray 27 regardless of whether the plunger 52 is in position to engage or disengage the spring clutch 31. If the plunger is retracted to disengage the spring clutch, the mass of the tray acts through the housing 12 and holds the end 38 of the hub 37 in frictional engagement with the end 39 of the nut 30. Since the latter is not working against a load but instead is being pushed by the mass of the tray, the frictional force resulting from engagement of the hub and the nut is sufficient to prevent the nut from rotating and thus the housing 12 will be advanced to the right even though the spring clutch 31 is disengaged. If the plunger 52 is extended, that same frictional force prevents rotation of the nut 30 and allows rightward advancement of the housing. If the housing is advanced sufficiently far to the right that the end wall 22 engages the bearing support 14, such engagement tends to force the housing to the left and tends to pull the end 38 of the hub 37 out of frictional engagement with the end 39 of the nut 30 so as to allow the latter to rotate and interrupt the positive drive to the housing 12. If the plunger 52 should happen to be extended at that time, the ring 45 simply slips on the control collar 40 as the collar rotates with the nut.

From the foregoing, it will be apparent that the present invention brings to the art a new and improved linear actuator 10 in which the driven member or housing 12 can be selectively driven by or released from the screw 11 by virtue of the spring clutch 31 holding the nut 30 against or releasing the nut for rotation. The friction clutch 32 acts in conjunction with the spring clutch to automatically interrupt the drive between the screw and the housing when the latter reaches a limit position and thus the friction clutch prevents the actuator from being damaged.

I claim:

1. A linear actuator comprising a drive screw adapted to be rotated about its own axis, a nut threaded onto said screw, a housing enclosing said nut and defining a driven member, said housing being fixed against rotation and being free to move axially along said screw to a stop position, a hub disposed within said housing and telescoped non-threadably over said screw, a helical spring telescoped over said hub and said nut and coupled to rotate with said nut whenever said nut is rotated, selectively operable means for causing said spring to wrap down on or release said hub thereby to prevent or permit relative rotation between said hub and said nut, said hub having an axially facing surface engageable frictionally with said housing to prevent relative rotation between said hub and said housing, and means located at said stop position for reducing the frictional engagement between said housing and the axially facing surface of said hub thereby to permit relative rotation between said hub and said housing.

2. A linear actuator as defined in claim 1 in which said hub further includes a radially facing surface disposed in frictional engagement with said housing.

3. A linear actuator as defined in claim 2 in which said radially facing surface is elastomeric.

4. A linear actuator as defined in claim 3 in which said radially facing surface is defined by the radially outermost surface of an O-ring extending circumferentially around said hub.

5. A linear actuator as defined in claim 1 in which said nut and hub have adjacent ends adapted to engage one another, the area of engagement between said ends being less than the area of engagement between said housing and the axially facing surface of said hub.

6. A linear actuator comprising a drive screw adapted to be rotated about its own axis, a nut threaded onto said screw, said nut moving axially along said screw when the screw is rotated and the nut is held against rotation, said nut remaining in a stationary axial position on the screw when the screw is rotated and the nut is allowed to rotate with the screw, a rotationally fixed and axially movable driven member, and first and second clutches operable to couple said nut to said driven member to hold said nut against rotation and effect axial movement of said driven member and operable to release said nut from said driven member to allow rotation of said nut and stop axial movement of said driven member, said first clutch being a selectively engageable and disengageable helical spring clutch having an input defined by said nut and having an output defining the input of said second clutch, and said second clutch being a friction clutch having its input disposed in frictional engagement with said driven member and capable of slipping relative to said driven member.

7. A linear actuator as defined in claim 6 further including an axially fixed stop on said screw and adapted to engage the input of said friction clutch to reduce the frictional engagement between said driven member and the input of said friction clutch.

8. A linear actuator comprising a drive screw adapted to be rotated about its own axis, a nut threaded onto said screw, a housing enclosing said nut and defining a driven member, said housing being fixed against rotation and being free to move axially along said screw, a selectively engageable and disengageable helical spring clutch disposed in said housing and having an input defined by said nut, the output of said spring clutch comprising a hub disposed within said housing and telescoped non-threadably onto said screw, said hub being disposed in frictional engagement with said housing, and means for reducing the frictional engagement between said hub and said housing when said housing is advanced to a predetermined position along said screw.

9. A linear actuator comprising a screw, a nut threaded onto said screw, a hub telescoped non-threadably over said screw, a helical spring telescoped over said hub and said nut and coupled to rotate with said nut whenever said nut is rotated, and selectively operable means for causing said spring to wrap down on or release said hub thereby to prevent or permit relative rotation between said hub and said nut.

\* \* \* \* \*